April 5, 1960     W. C. ANDERSON     2,931,224
LIQUID LEVEL MEASURING SYSTEM
Filed June 28, 1955     4 Sheets-Sheet 1

INVENTOR.
WILMER C. ANDERSON
BY R. J. Dearborn,
ATTORNEY

April 5, 1960

W. C. ANDERSON 2,931,224

LIQUID LEVEL MEASURING SYSTEM

Filed June 28, 1955

INVENTOR.
WILMER C. ANDERSON
BY

ATTORNEY

Fig. 8.

INVENTOR.
WILMER C. ANDERSON
BY R. J. Dearborn,
ATTORNEY

United States Patent Office 2,931,224
Patented Apr. 5, 1960

2,931,224

LIQUID LEVEL MEASURING SYSTEM

Wilmer C. Anderson, Greenwich, Conn., assignor to The Liquidometer Corporation, Long Island City, N.Y., a corporation of Delaware Application June 28, 1955, Serial No. 518,540

18 Claims. (Cl. 73—295)

This invention is concerned in general with liquid level measuring; and more particularly with an apparatus for measuring the level of the liquid in a container. The invention is most particularly adaptable to measuring liquid level in closed containers.

This invention employs, or makes use of, the principle of heat exchange. Among the practical aspects of heat exchange, there is included the fact that there is a marked difference of the transferability of heat, first from a given body to a liquid surrounding the body, and second from a given body to a gas surrounding the body. Consequently, this principle is employed to enable the determination of the height of a body of liquid that is carried in a container, because any such body of liquid must have a variable amount of gas over the liquid in the container, as the level of the liquid varies.

The invention is particularly beneficial for use in permanently closed containers. In such case the construction may be such that there is a tube running vertically through the container, and all the rest of the apparatus necessary for the level measuring system may be located in a convenient manner on the outside of the container. Therefore, all of the moving or other wearing parts of the system which might need repair, will be located for easy access thereto. Furthermore, in connection with certain applications where extremely high temperatures and pressures are involved, e.g. high pressure boilers and the like, it is not feasible to construct the boiler with any electrical connections passing through the walls thereof because the necessary insulation could not withstand the high temperatures and pressures. By making use of this invention such boilers may be constructed with the necessary tubing welded in place in the boiler so that the necessary strength of the container will not be in any way impaired.

Consequently it is an object of the invention to provide an apparatus for measuring liquid level which employs the use of heat exchange.

Another object of the invention is to provide a system that makes use of certain heat exchange paths, and wherein there are no moving parts whatever, employed within the liquid-containing vessel.

Another object of the invention is to provide a system that is particularly adapted for use in closed tanks wherein there is a minimum of elements in the tank, and those which are to be found therein, are built in permanently.

Still another object of this invention is to provide a system which may be employed in high pressure-high temperature tanks. In order to do so, use is made of tubes which may be of the same material as the tank and consequently will be fastened securely in place as by welding, in order to maintain the full strength structural closure of the tank. Then, by use of the principles of this invention, fluid is circulated through such tubes in order to create a heat exchange for the purpose of determining the level of the liquid within the tank.

The invention may be summarized as one providing a means by which a conductor, which may be a pipe for a fluid or an electrical conductor for electrical energy, is arranged to extend from the top to the bottom of the container or at least over the vertical range of the levels of liquid therein to be gauged, so as to be immersed in the liquid to an extent dependent upon the level thereof in the container.

In one embodiment of this invention, a fluid such as a temperature-sensitive liquid, may be transmitted through this conductor or pipe as a part of an orbital path, in some other part of which, i.e. outside the container to be gauged, the temperature-sensitive fluid is brought to a temperature substantially different from that of the container to be gauged and of the liquid therein. This may be done by raising the temperature of the circulating fluid substantially above that of the container and its liquid contents or reducing it substantially below such temperature. In either event, the fluid being circulated through the container will be at a temperature such that there will be a heat interchange between this fluid and its surroundings at a rate which will depend upon whether the conductor or pipe is immersed in the liquid or not. If then the temperature change in the fluid can be ascertained, for example, by temperature-sensing means at the entrance and exit of the conductor in question with respect to the container, the temperature difference may be used as a measure of the temperature change of the fluid passing through the liquid; and this in turn may be used to indicate the level of the liquid.

From another and preferred point of view in accordance with the present invention, a plurality, and specifically three, conductors are used, one extending more or less vertically and immersed in the liquid to be gauged to an extent dependent upon the level thereof as aforesaid, a second being disposed wholly above the liquid so as to be immersed solely into the vapor thereof, and a third being disposed wholly below the level of the liquid so as wholly to be surrounded by the liquid in the container. These three conductors, which may be either pipes for fluid or conductors for electrical energy, are similarly maintained at temperatures substantially different from their surroundings, so as to set up a heat exchange as aforesaid; and then this rate of heat exchange from each of the conductors is suitably measured. In the event that electrical energy is used, it is necessary, of course, that the conductor shall be at a temperature above that of the surroundings, as there is no way to reduce the temperature of a solely electrical conductor below that of its surroundings. On the other hand, this limitation does not apply to pipes for fluids, which may be alternatively higher or lower in temperature than the surroundings. The temperature-sensing means may involve either sensing the temperatures at the inlet and outlet points in the case of fluids; or may involve means subject to the temperature throughout the length of the conductor, which is applicable to either fluids or electrical energization as hereinafter more particularly described.

By suitably comparing the temperature change affected by the heat interchange aforesaid, it is possible to get a quite accurate measure of the liquid level. This is particularly true when the comparison is made between the actual temperature or temperature drop attained by the conductor traversing both the liquid and the vapor thereabove as compared with the temperature change or actual temperature of the conductor traversing the vapor space alone to give a first comparison result; and then comparing this first comparison result with a second comparison result obtained by comparing the temperature drop or actual temperature of the conductor extending solely through the liquid with the temperature drop or actual temperature of the conductor disposed solely above the liquid. The overall result calibrated in units of liquid level or volume may be shown by a ratiometer in a very simple embodiment of the invention, or may be arrived at to actuate an indicator by the use of a balanceable bridge-type circuit as illustrated in other embodiments of the invention.

Certain embodiments of this invention are set forth below, by way of illustration thereof, and are described in some detail in connection with the drawings, in which.

The principles used as a basis for this invention may best be described in connection with Fig. 8. The elements of the system there illustrated include the following: A closed tank 11 has a liquid 12 contained therein, which may be variable in quantity so that the level of the liquid changes within the tank 11. Located vertically as viewed in Fig. 8, i.e. transversely to the surface of the liquid 12, there is a tube 13 which extends the full height of the tank 11, through the bottom and top thereof. The tube 13 is connected at its ends to the ends of a heating coil 14 that is located within a heating chamber 15, which has a heating element 16 therein. The heating element 16 may be any convenient type of heat source, e.g. an electrical heating element, that is adapted for connection to a source of power (not shown) in the usual manner. The chamber 15 may have an inlet 17 and an outlet 18 for circulating a fluid through the chamber 15, in order to aid in controlling the amount of heat supplied from the heating element 16 to the coil 14. There is a pump 19 for circulating fluid through the tube 13 and the heating coil 14. There is a pipe 20 connecting one end of the heating coil 14 with the inlet side of the pump 19, while a pipe 21 connects the outlet of pump 19 with the lower extremity of the tube 13. The upper extremity of the tube 13 is connected to the other end of heating coil 14 by a pipe 22. Pump 19 is operated so as to maintain a constant velocity of fluid circulation through the tube 13.

Figure 8:
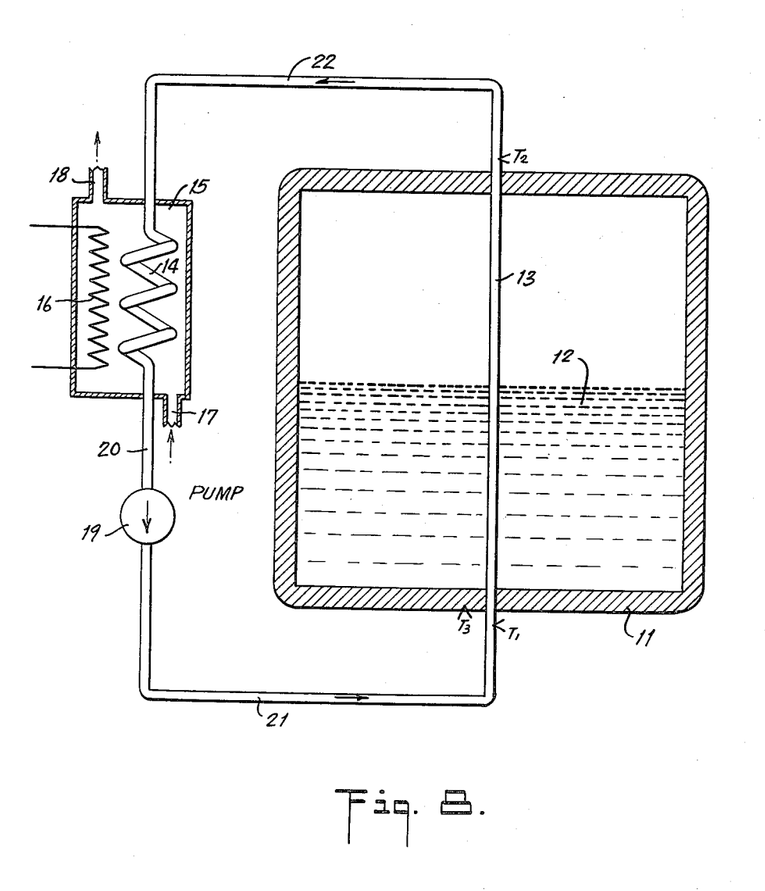
Fig. 8 is a schematic diagram illustrating a closed tank with a simple fluid circulating arrangement which may be employed in carrying out a basic method according to this invention.

A basic method contemplated for use for measuring the level of liquid in a tank, e.g. liquid 12 in tank 11 as illustrated in Fig. 8, may best be explained in connection with Fig. 8. It will be observed that the length of the tube 13 which is immersed in the liquid 12 may be determined as related to the length of the tube 13 within the tank 11 in the following manner: First, by regulating the amount of heat applied to the fluid circulating through tube 13, the temperature difference between the liquid in the tube 13 as it enters the lower extremity thereof (i.e. at point $T_1$), and that of the liquid 12 (adjacent to the lower end of tube 13, i.e. at point $T_3$), is maintained constant. This regulation of the amount of heat applied to the fluid being circulated through tube 13 may be accomplished in any convenient manner, as by controlling the amount of heat applied by the heating element 16, or by controlling the circulation of heat exchange fluid in the chamber 15, or a combination of the two. Apparatus for thus controlling the amount of heat applied may be conventional and is not illustrated.

At the same time, the flow of fluid in the circulating system, through the tube 13, is maintained at a constant rate.

Then, under these conditions the temperature difference between the fluid entering tube 13 (at the bottom) and the fluid leaving tube 13 (at the top of tank 11), i.e. between points $T_1$ and $T_2$, is a measure of the amount of heat transferred between the fluid in tube 13 and the contents of the tank 11, in a unit of time. This quantity of heat transferred is, in turn, a function of the temperature difference between points $T_1$ and $T_3$ (which is constant), as well as a function of the relative length of the tube 13 that is submerged in the liquid 12.

Thus, under these conditions the temperature difference between points $T_1$ and $T_2$ is proportional to the amount of the tube 13 that is submerged in the liquid 12. Consequently, any means for indicating this temperature difference may be calibrated so as to read in terms of the level of the liquid 12 in the tank 11.

Figure 1:
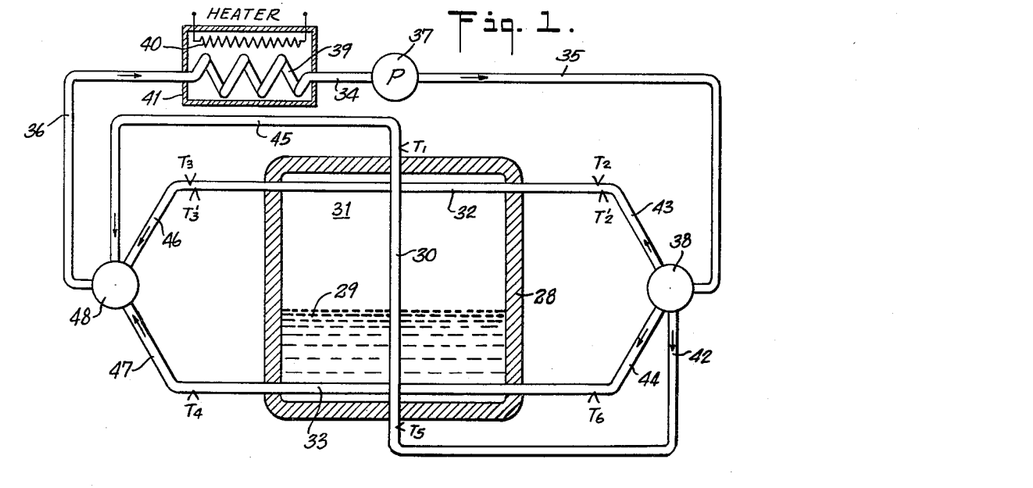
Fig. 1 is a schematic diagram showing a closed tank with a fluid circulating system for use in measuring the liquid level in the tank.

A preferred apparatus for carrying out this invention is illustrated in Fig. 1, where there is shown a tank 28 having a liquid 29 therein, that may vary in quantity and consequently in the level of the liquid within the tank 28. Located vertically through the tank 28, i.e. transversely to the surface of liquid 29 therein, there is a tube 30 that will carry a fluid for effectuating heat exchange with the liquid 29, and with the atmosphere in a space 31 above the level of liquid 29 within tank 28. There are, in addition, two tubes 32 and 33 which lie generally horizontally within the tank 28. The tube 32 is located close to the top of the space 31 within the tank 28 so that it will always remain above the surface of the liquid 29, even when the liquid is at its maximum, or full level. Tube 33 is similarly located, but at the bottom of the tank 28, so as to be at all times submerged in the liquid 29 even when the liquid is at its lowest or empty level.

There is provided a circulating pump 37 which is connected at its input to a pipe 34, and at its output to a pipe 35 for circulating a heated fluid in the direction of the arrows. Pipe 35 is also connected to a manifold 38, and pipe 34 leads from one end of a heat exchange coil 39. The other end of coil 39 has a pipe 36 connected thereto.

Heat is added to the fluid in the circulating system by means of an electrical heating element 40, that is located adjacent to the heating coil 39 within a heating container 41. The heated fluid is circulated through tubes 30, 32 and 33 at a constant rate and in the direction of the arrows, by means of connecting pipes 42, 43 and 44 respectively. At the other end of each of the three tubes 30, 32 and 33, there are other connecting pipes 45, 46 and 47 respectively which lead to a circulation manifold 48 which is in turn connected to the pipe 36. Located at the points on the circulation system as indicated by the V-shaped symbols marked "$T_1$–$T_6$" and "$T_2'$, $T_3'$," there are thermocouple junctions for measuring the temperature of the fluid entering and leaving each of the three tubes 30, 32 and 33.

It has been discovered that the amount of heat applied to the circulation system, including the tube 30, need not be regulated as in the basic method above, but may be maintained constant. The level of the liquid 29 within the tank 28 is determined as being the ratio of:

The temperature difference between the ends of the tube 30 minus the temperature difference between the ends of tube 32, as the numerator, and the temperature difference between the ends of tube 33 minus the temperature difference between the ends of the tube 32, as the denominator, all times the length of the tube 30. This determination may be expressed in the following form as an equation:

(1) $$L_2 = \frac{L(\Delta T_x - \Delta T_s)}{(\Delta T_w - \Delta T_s)}$$

where $L_2$ equals the length of the pipe 30 in the fluid 29.

In the above equation and in certain equations which follow, a number of terms are used which are defined as follows:

$L$ = the total length of the measuring portion of the pipe 30;
$L_1$ = the length of the tube 30 above the liquid 29 and exposed only to vapor;
$L_2$ = the length of the tube 30 submerged in the liquid 29;
$L_s$ = the length of the reference tube 32 (in vapor only);
$L_w$ = the length of reference tube 33 (in liquid only);
$H_1$ = the heat transfer for section $L_1$;
$H_2$ = the heat transfer for section $L_2$;
$H_s$ = the heat transfer for section $L_s$;
$H_w$ = the heat transfer for section $L_w$.
$\Delta T_x$ = the change in temperature of the heat exchange fluid in passing through the tube 30, i.e. $T_5 - T_1$ where $T_5$ and $T_1$ are the temperatures at $T_5$ and $T_1$, Fig. 1, respectively.
$\Delta T_s$ = the change in temperature of the fluid in passing through tube 32, i.e. $T_2 - T_3$, where $T_2$ and $T_3$ are the temperatures of the fluid at $T_2$ and $T_3$ respectively, Fig. 1.
$\Delta T_w$ = the change in temperature of the fluid in passing through the tube 33, i.e. $T_6 - T_4$ where $T_6$ and $T_4$ are the temperatures at the points $T_6$ and $T_4$ respectively, Fig. 1.
$\Delta T_1$ = the change in temperature of the fluid in passing through section $L_1$ of pipe 30, i.e. that portion thereof which is surrounded only by vapor.
$\Delta T_2$ = the change in temperature of the fluid in passing through portion $L_2$ of pipe 30, i.e. that portion thereof which is immersed in the liquid 29.

The derivation of Equation 1 using the above-defined terms is as follows:

(2) $H_1/H_s = L_1/L_s = \Delta T_1/\Delta T_s$
(3) $H_2/H_w = L_2/L_w = \Delta T_2/\Delta T_w$
(4) $L = L_1 + L_2$ Substituting in Equation 4 a definition of $L_1$ from Equation 2, there results (5) $L = L_s \Delta T_1/\Delta T_s + L_2$ It is obvious, however, (6) $\Delta T_x = \Delta T_1 + \Delta T_2$ Therefore, solving Equation 6 for $\Delta T_1$ and substituting this value in Equation 5, there results (7) $L = L_s \Delta T_x/\Delta T_s - L_s \Delta T_2/\Delta T_s + L_2$ and solving Equation 3 for $\Delta T_2$, then substituting this value in Equation 7 there results (8) $L = L_s \Delta T_x/\Delta T_s - L_s L_2 \Delta T_w/L_w \Delta T_s + L_2$ transposing terms, this gives (9) $L_2 = (L - L_s \Delta T_x/\Delta T_s) \frac{1}{(1 - L_s \Delta T_w/L_w \Delta T_s)}$ If, however, $L_s$, $L_w$ and $L$ are all made the same length (by construction), then:

(1) $L_2 = L(\Delta T_x - \Delta T_s)/(\Delta T_w - \Delta T_s)$

Since all the right hand parameters in Equation 1 are mensurable, $L_2$ is uniquely determined.

The method carried on by the apparatus of the present invention of thus determining the level of liquid in the tank 28 includes the necessary steps for solving Equation 1 above. These include the following: Measure the difference between the temperatures of the circulation fluid at the ends of the tube 30. Measure the difference between the temperatures of the circulation fluid at the ends of the tube 32. Measure the difference between the temperatures of the circulation fluid at the ends of the tube 33. Compare these temperature differences by subtracting the temperature difference of the fluid in tube 32 from the temperature difference of the fluid in tube 30, and dividing the result by the result of similarly subtracting the temperature difference of the fluid in tube 32 from that of the fluid in tube 33. Then this ratio represents that fraction of the length of tube 30 that is submerged in the liquid 29.

Various means in accordance with the present invention may be employed to carry out the steps of this method as will be clear to one skilled in the art as described below.

Figure 2:
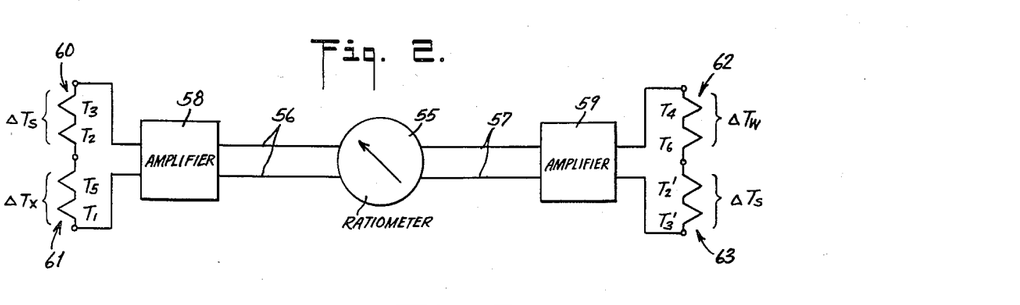
Fig. 2 is a circuit diagram illustrating one manner in which the liquid level indication may be effectuated.

Referring to Fig. 2 it is pointed out that there is illustrated a circuit for a system which may be employed in connection with the arrangement illustrated in Fig. 1. Thus, the derived height of the liquid level as a fraction of the length of tube 30 may be directly indicated by means of a properly calibrated ratiometer 55. Such a ratiometer may be any one of various types of instruments for comparing two input voltages and indicating the ratio of their difference. A ratiometer of this type which may be employed is that shown in a patent to Lingel No. 2,391,057 issued December 18, 1945 and assigned to the same assignee as this application. As input circuits to the ratiometer 55 there are two pairs of wires 56 and 57 which lead from amplifiers 58 and 59 respectively. These amplifiers may be any feasible type, e.g. vacuum tube amplifiers or even magnetic amplifiers. Connected to the input of amplifier 58 there is the combined output of two of the thermocouples, which are marked correspondingly, to indicate their location on the system of Fig. 1. It will be noted that two thermocouple junctions $T_2$ and $T_3$, together form a single thermocouple 60 that is marked "$\Delta T_s$"; since it is this thermocouple which measures the temperature difference between the ends of the tube 32 as determined by the junctions $T_2$ and $T_3$ adjacent thereto. Similarly, there is a thermocouple 61 formed by junctions marked $T_5$ and $T_1$, which together may be represented as the $\Delta T_x$ temperature difference of Equation 1 above. It is pointed out that the thermocouples 60 and 61 are connected in opposition so that the E.M.F., generated by each, oppose one another to introduce the difference between their voltages to the input of the amplifier 58.

At the other side of the ratiometer 55 the circuit is similar and there is a thermocouple 62 that has junction elements $T_4$ and $T_6$, which together may be represented by $\Delta T_w$ and produce an E.M.F. which is a measure of the temperature difference at the ends of the tube 33. Likewise, a thermocouple 63 is composed of the junctions $T_2'$ and $T_3'$, which are so connected as to produce an opposing E.M.F. to that generated by the thermocouple 62. The resulting E.M.F. is then connected by the series circuit illustrated to the input of the amplifier 59.

The ratiometer 55 may be properly calibrated to indicate the level of the liquid 29 within the tank 28 at all times, so long as the circulation of fluid through the tubes 30, 32 and 33 is maintained constant, and the lengths of tubes 30, 32 and 33 are all equal.

Figure 3:
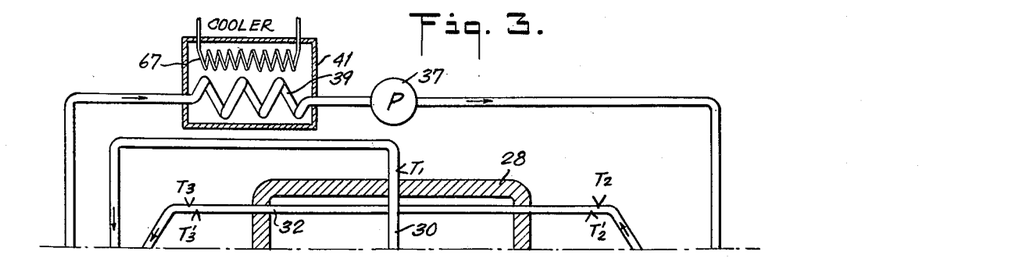
Fig. 3 is a fragmentary schematic similar to the system shown in Fig. 1, illustrating the use of a circulation of fluid that is below the temperature of the liquid, the level of which is being measured.

The heat exchange as provided by the tubes 30, 32 and 33 of the system illustrated in Fig. 1 may be the reverse of that illustrated. In other words, the temperature of the circulating fluid as supplied to these tubes may be below, rather than above, that of the liquid 29 in the tank 28. This arrangement is illustrated in Fig. 3 where the elements that remain the same have the same reference numbers as in Fig. 1. The only difference is that in place of the heater 40 of Fig. 1, there is a cooling coil 67 which is located within the heat exchange container 41 to remove heat from the fluid flowing through the coil 39 of the fluid circulating system for the tubes 30, 32 and 33 carrying fluid for applying the principles of heat exchange to the tank 28 over predetermined paths. Thus it will be observed that the same principles apply, and similar results may be obtained, by using a reverse exchange of heat from the liquid in the tank 28 to the circulation system rather than the reverse where the heat exchange takes place from the circulating fluid to the liquid 29 in the tank 28.

Figure 4:
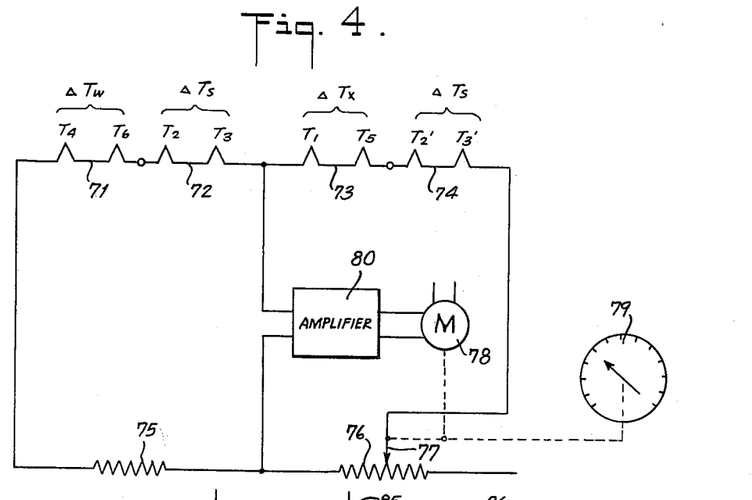
Fig. 4 is a circuit diagram illustrating a different arrangement for indicating the level of the liquid in connection with a system like that of Fig. 1 or of Fig. 3.

Fig. 4 illustrates another arrangement whereby the level of the liquid 29 in the tank 28 may be indicated in accordance with Equation 1. In this case there is provided a balanceable network which includes thermocouples 71 and 72 as one arm of the balanceable network, while thermocouples 73 and 74 constitute another arm thereof, on the opposite side of the balanceable network. In series with the thermocouples 71 and 72, on that side of the network, there is a resistor 75. On the other side of the balanceable network, and in series with the thermocouples 73 and 74, there is a variable resistor 76 having a sliding contactor 77 in connection therewith. Contactor 77 is mechanically connected to a motor 78 for movement thereby. Also connected to the motor 78 in a mechanical manner, there is an indicator 79 that will be positioned in accordance with the position of the sliding contactor 77 on the variable resistor 76. Motor 78 is energized for rotation by the output of an amplifier 80, that is connected to the output of the balanceable network which resembles an electrical bridge, and which includes the thermocouples 71–74 as well as the resistors 75 and 76. The amplifier 80 and motor 78 may take various forms. Electric servo systems employing such an arrangement are well known, and need not be described in detail herein.

The operation of the system according to Fig. 4 is such as to compare the outputs of the thermocouples in accordance with the Equation 1, which is satisfied whenever the balanceable network is in balance. Under balance conditions, the motor 78 is deenergized since the balanceable network has a zero output. By choosing proper values for the various circuit elements, the network may be balanced over the entire range of liquid level change, and the indicator 79 may be calibrated to read in terms of the quantity of liquid in the tank 28.

Figure 5:
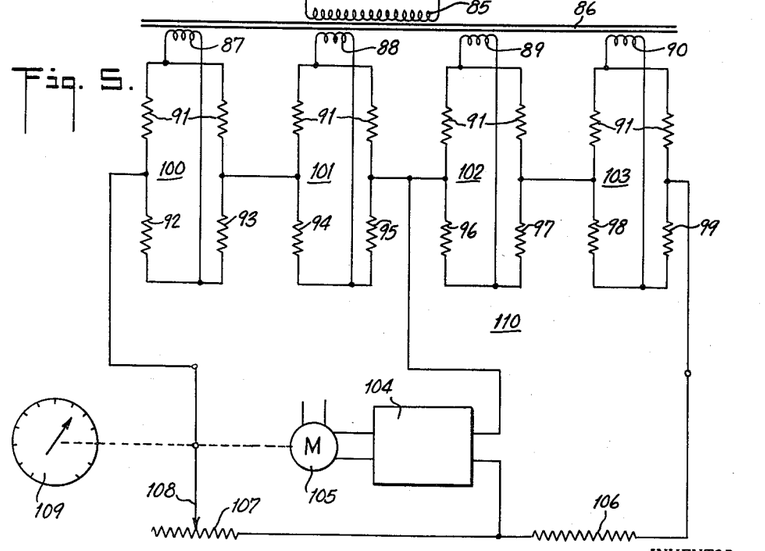
Fig. 5 is a circuit diagram showing another arrangement for measuring the liquid level in connection with a system like that of Fig. 1, or 3, which makes use of temperature-sensitive resistors instead of thermocouple elements.

In Fig. 5 there is illustrated another arrangement for measuring the level of liquid 29 in the tank 28, while using substantially the same apparatus as illustrated in Figs. 1 and 3. In this case, however, in place of employing thermocouples for measuring the temperatures at desired points on the system, use of temperature-sensitive resistors is had. It will be appreciated that in place of temperature-sensitive resistors, other temperature-sensitive impedances might be employed, such as inductances having core material, the permeability of which changes rapidly with changes of temperature, over a desired range.

In Fig. 5 there is illustrated another embodiment of the invention, comprising an electrical network including temperature-sensitive resistors which are arranged to be used, for example, in conjunction with either of the devices of Fig. 1 or Fig. 3. As shown in Fig. 5, there is a source of alternating voltage indicated as a primary winding 85 of a transformer 86, which has four secondary windings 87, 88, 89, and 90, which are all alike in their construction and electrical characteristics. Each of the secondary windings 87–90 is connected to a separate bridge network, which includes a pair of resistors 91 as two of the arms thereof, all the resistors 91 being of equal resistance value. The other resistances in these separate bridge networks are numbered 92–99 inclusive respectively; and all these resistors 92–99 have an equal resistance at any given temperature, the resistors 92–99 being temperature-sensitive resistances and being located as follows with respect to Fig. 1:

Resistor 92 is located to be responsive to the temperature at $T_2$;

Resistor 93 is located to be responsive to the temperature at $T_3$;

Resistor 94 is located to be responsive to the temperature at $T_1$;

Resistor 95 is located to be responsive to the temperature at $T_5$;

Resistor 96 is located to be responsive to the temperature at $T_6$;

Resistor 97 is located to be responsive to the temperature at $T_4$;

Resistor 98 is located to be responsive to the temperature at $T_3$ or $T_3'$; and Resistor 99 is located to be responsive to the temperature at $T_2$ or $T_2'$.

The four separate bridge networks energized by the secondary windings 87–90 respectively are designated as bridge networks 100, 101, 102 and 103; and these networks are connected in series as shown, but with their outputs opposing one another. It is intended that the output of bridge 100 shall be proportional to $\Delta T_s$; that of bridge network 101, proportional to $\Delta T_x$; that of bridge network 102, proportional to $\Delta T_w$; and that of bridge network 103, proportional to $\Delta T_s$. Furthermore, these pairs of bridge networks comprise elements of two of the arms of a balanceable bridge or servo network 110. This servo network has its output connected as the input of an amplifier 104 that is electrically connected to energize a motor 105 whenever the network 110 is unbalanced. One side of the balanceable network 110 is made up of a series circuit including the bridge networks 102 and 103 connected in series with a fixed resistor 106. The other side of the network 110 includes bridge networks 101 and 100 connected in series with each other and with a variable portion of a resistor 107, which has a sliding contactor 108 associated therewith. The motor 105 is connected mechanically to the sliding contactor 108 by a mechanical connection illustrated diagrammatically as a dashed line; while at the same time an indicator 109 is also mechanically connected to the motor 105 to be positioned in accordance with the setting of the contactor 108. It will be understood that whenever the output of the bridge 110 is other than zero, the motor 104 will be actuated to reposition the contactor 108 and the indicator 109 so as to rebalance the bridge and thereby to reduce the output thereof substantially to zero. The system illustrated in Fig. 5 operates in a manner similar to that of Fig. 4 to provide an indication by means of the indicator 109 of the liquid level in the container 28, the indicator being properly calibrated to show the level from the extreme conditions of "empty" to "full" for the tank. When employing an arrangement of this type, the level of the liquid may be determined by the indicator 109, the liquid level being proportional to the angular position of the indicator pointer.

This may be proved mathematically by a series of steps using the following terms in addition to those above defined:

$R$ = the resistance of each of the resistors 92–99 at a base temperature $T_0$;

$R_0$ = the resistance of each of the resistors 91, which is made very much greater than the resistances of any of the resistors 92–99;

$R_1$ = the resistance value of the fixed resistor 106;

$R_2$ = the resistance value of that portion of the variable resistor 107 which is included at any instant in the bridge circuit 110;

$k_2$ = a constant;

$\theta$ = the angle of rotation of the indicator 109, i.e. the angle to which the indicator is set to indicate any given value of the level of the liquid;

$R_{T_1}$ = the resistance value of resistor 94 at its operating temperature $T_1$;

$R_{T_2}$ = the resistance value of resistor 92 at its operating temperature $T_2$; and is also the resistance value of resistor 99 at temperature $T_2$;

$R_{T_3}$ = the resistance value of resistor 93 at its operating temperature $T_3$; and also the resistance value of resistor 98 at temperature $T_3$;

$R_{T_4}$ = the resistance value of resistor 97 at its operating temperature $T_4$;

$R_{T_5}$ = the resistance value of resistor 95 at its operating temperature $T_5$;

$R_{T_6}$ = the resistance value of resistor 96 at its operating temperature $T_6$.

$\alpha$ = the temperature coefficient of resistance for any given installation (a constant);

$E_0$ = the voltage applied to the input of each of the bridge networks 100–103, i.e. the outputs of each of the secondary windings 87–90, each of these voltages being equal to the others;

$E_{T_1}$ = the voltage drop across resistor 94;

$E_{T_2}$ = the voltage drop across resistor 92, and is also the voltage drop across resistor 99;

$E_{T_3}$ = the voltage drop across resistor 93 and is also the voltage drop across resistor 98;

$E_{T_4}$ = the voltage drop across resistor 97;

$E_{T_5}$ = the voltage drop across resistor 95;

$E_{T_6}$ = the voltage drop across resistor 96;

$\Delta E_x$ = the output voltage from the bridge network 101;

$\Delta E_s$ = the output voltage from the bridge network 100 and is also the output voltage from the bridge network 103;

$\Delta E_w$ = the output voltage from the bridge network 102.

Having defined the terms, the equation for the operation of the system of Fig. 5, which is proven as hereinbelow outlined is as follows:

(10) $\quad L_2 = L(R_2/R_1) = k_2\theta$

The derivation of Equation 10 is as follows:

The resistance of each of the resistors 92–99 at the actual or operating temperature may be expressed as (11) $\quad R_{T_1} = R[1+\alpha(T_1-T_0)]$ (12) $\quad R_{T_2} = R[1+\alpha(T_2-T_0)]$ $R_{T_3}$ to $R_{T_6}$ may be similarly defined.

Considering now the network 101 and particularly the voltage drop $E_{T_1}$ across the resistor 94, this may be defined as $E_{T_1} = R_{T_1}[E_0/(R_{T_1}+R_0)]$ but as $R_{T_1}$ is very small as compared with $R_0$ then (13) $\quad E_{T_1}$ is approximately equal to $R_{T_1}[E_0/R_0]$ In a similar manner, $E_{T_2}$ is approximately equal to the same fraction $(E_0/R_0)$ times $R_{T_2}$, or we may say (14) $\quad E_{T_2} = R_{T_2}[E_0/R_0]$ The other similar voltage drops ($E_{T_3}$ to $E_{T_6}$) may be similarly worked out as (15) $\quad E_{T_5} = $ (approximately) $[E_0/R_0]R_{T_5}$ However, as each of the networks 100 to 103 is itself a little bridge network having opposing arms, the output from these networks will be equal to the difference between the voltage drops in the arms thereof wherein such voltage drops may differ, or as to the network 101, for example, $\Delta E_x = E_{T_5} - E_{T_1}$ which is equal to $$[E_0/R_0](R_{T_5}-R_{T_1})$$

this last transition utilizing the definitions of $E_{T_1}$ and $E_{T_5}$ in Equations 13 and 15 above. If then we substitute the values of $R_{T_1}$ and $R_{T_5}$ from Equations 10 and 11 and simplify, it is found that $$\Delta E_x = [E_0/R_0]R\alpha(T_5-T_1)$$

and from the former definition of $\Delta T_x$ then $$\Delta E_x = [E_0/R_0]R\alpha\Delta T_x$$

Solving this equation for $\Delta T_x$, there results (16) $\quad \Delta T_x = [R_0/(E_0R\alpha)]\Delta E_x$ and if we let the fraction $[R_0/(E_0R\alpha)]$ equal $k_1$, as all the terms thereof are constants, then (17) $\quad \Delta T_x = k_1 \Delta E_x$ In the same way it may be proved (18) $\quad \Delta T_s$ equals $k_1 \Delta E_s$; and $\Delta T_w = k_1 \Delta E_w$ Then substituting these values of $\Delta T_x$, $\Delta T_s$ and $\Delta T_w$ from Equations 16, 17 and 18 in Equation 1 above, we have (19) $\quad L_2 = L\dfrac{\Delta E_x - \Delta E_s}{\Delta E_w - \Delta E_s}$ In view of the fact that the circuit of Fig. 5 is connected as it is, and with the sub-networks 100 and 104 are connected in opposition as aforesaid, it will be seen that when the network 110 is balanced, (20) $\quad L_2 = L(R_2/R_1) = k_2\theta$ Thus the depth of the liquid 29 in the tank or container 28 may be accurately indicated by the angular position of the indicator 109.

Figure 6:
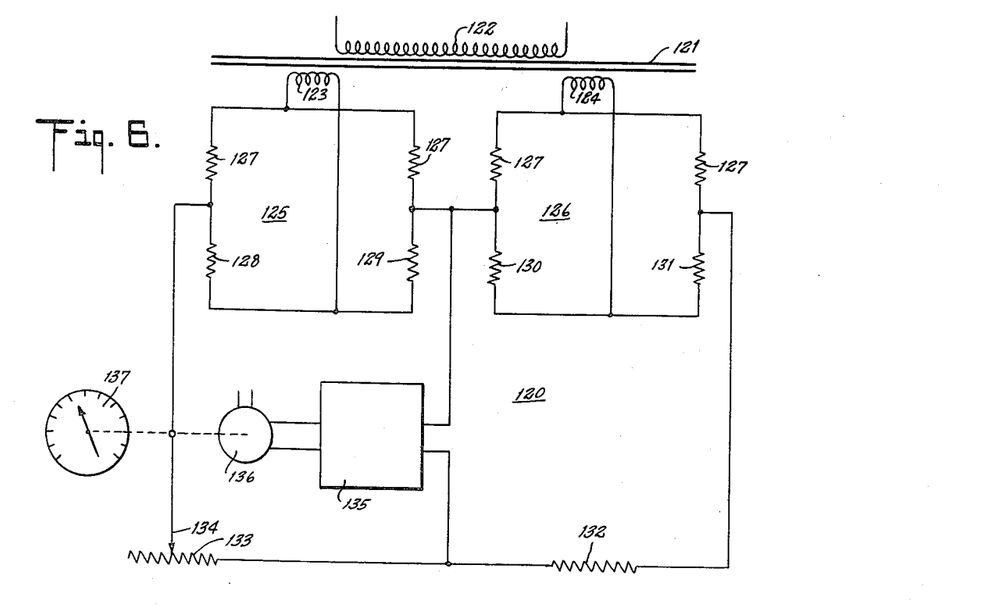
Fig. 6 is a circuit diagram illustrating a system which may be employed alternatively to the fluid circulating systems of Figs. 1 and 3, and that employs an electrical heating element and an adjacent temperature-sensitive resistance.
Figure 7:
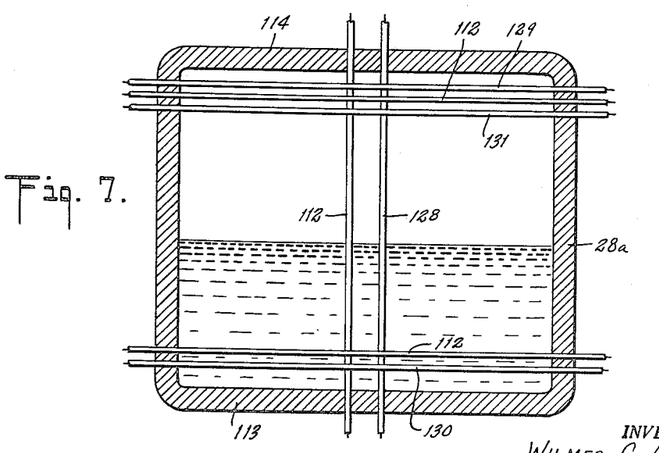
Fig. 7 illustrates a form of the invention, employing electric heating units and temperature-sensitive resistors respectively adjacent thereto, of the type to be used in a system according to Fig. 6.

In Figs. 6 and 7 there is illustrated a system in which substantially the same principles according to the invention may be employed, but instead of using a circulating fluid in the usual sense for the heat exchange paths (e.g. tubes 30, 32 and 33); an electric heating element is employed for providing a heat exchange path to be located in the same manner as the arrangement illustrated in Fig. 1. This electrical arrangement would not be feasible, for use where the temperatures and pressures are prohibitively high with respect to the materials for insulating the necessary wires in connection with the electrical heating element and the electrical temperature-sensitive resistor that are employed. However, this system may find beneficial use where a closed tank or container is to be constructed in such a maner that access to the interior thereof would be difficult or prohibitive. Consequently this arrangement according to the invention provides means for measuring the liquid level within such a tank, without having any moving parts located within the tank, which could wear out during the life of the tank itself.

The theory of the liquid level measurement in this instance is similar to that described above in connection with a circulating fluid, so that when the comparable elements are indicated, it will be clear that the liquid level measurement is comparable.

Referring to Fig. 7, there is shown a container 28a similar to the container 28 of Fig. 1 and wherein there are three similar electric heating elements 112, all having the same electrical and heat-producing characteristics. Adjacent to the vertically disposed element 112, which is shown extending through horizontal wall portions 113 and 114 of the container 28a, and located parallel thereto, is a temperature-sensitive resistance element 128 corresponding to the element shown in the diagrammatic Fig. 6 and identified by the same reference number. The element 128 is likewise arranged to pass through the walls 113 and 114 of the container 28a. Similarly, there are a pair of parallel elements including a heating element 112 and a temperature-sensitive resistance element 130 arranged adjacent to the bottom of the container 28a and normally continuously immersed in the liquid therein in the same manner as the element or pipe 33 of Fig. 1. The temperature-sensitive resistance element 130 is connected as shown for the correspondingly numbered resistance in Fig. 6. Arranged in the upper portion of the container 28a and in a manner so as always to be above the level of the liquid therein is a heating element 112 and a pair of temperature-sensitive resistance elements 129 and 131. These temperature-sensitive resistance elements correspond to those shown in Fig. 6 and are both arranged to be similarly subject to the heat generated by the adjacent heating element 112, so that both receive heat in the same amount from this heating element. These elements are located in a manner similar to the tube 32 of Fig. 1. With this arrangement the transfer of heat from each heating element 112 to the surrounding medium in the tank 28a is measured by the closely associated and parallel-located temperature-sensitive resistance over the entire length of each of the respective heating elements 112. Then, by applying constant voltage to the heating elements 112, the resistance values of the respectively associated temperature-sensitive resistance elements will provide the necessary relationships when they are connected in a circuit as shown diagrammatically in Fig. 6.

Referring to Fig. 6, it will be observed that there is a servo-type balanceable network 120, that is energized from a transformer 121 which has a primary winding 122. There are two secondary windings 123 and 124 of the transformer 121 which have an equal number of turns, and these provide similar input energization for two bridge networks 125 and 126 respectively. Each of the bridge networks 125 and 126 has a pair of resistors 127 which are equal in resistance value. The bridge 125 includes a resistor 128 that is temperature sensitive and is mounted in a manner that corresponds to the temperature-sensitive resistance 115 located adjacent to the heating element 112. This resistor 128 is the one that parallels the heat transfer path corresponding to tube 30 of Fig. 1. The remaining resistor in bridge 125 is a resistor 129 which is the temperature-sensitive resistor accompanying the heating element located horizontally at the top of the tank, in the space above the liquid. In bridge 126 there is a resistor 130 which is the resistance element accompanying the heating element that lies horizontally at the bottom of the tank. A resistor 131 is another temperature-sensitive resistor which lies adjacent to the upper horizontal heating element. One side of the balanceable network 120 includes the bridge 126 and a fixed resistor 132 while the other side thereof includes the bridge 125 and a variable resistor 133. Resistor 133 has a sliding contactor 134 in connection therewith. The output of network 120 is connected to the input of an amplifier 135, the output of which feeds a motor 136 which has a mechanical connection that drives the contactor 134 and also an indicator 137. Therefore, in accordance with the above explanation of the forms of Figs. 2, 4 and 5, the balanceable network 120 will control the operation of indicator 137, so that when properly calibrated, the indicator 137 will show the level of the liquid in the tank at all times so long as the balanceable network 120 is maintained in balance.

This arrangement may be explained in equation form in like manner to the corresponding equations above. For example see Equation 1 and note that by relating the terms thereof to the elements of Figs. 6 and 7:

$L_2$=length of heater 112 submerged in liquid (29)
$L$=total length of heater 112 (located vertically in tank)
$\Delta T_x$=difference in temperature over measuring heat exchange path
$\Delta T_s$=difference in temperature over heat exchange path wholly above liquid
$\Delta T_w$=difference in temperature over heat exchange path wholly submerged in liquid Similarly, Equation 19 may be related to Fig. 6 system as follows:

$$(19) \quad L_2 = L \frac{\Delta E_x - \Delta E_s}{\Delta E_w - \Delta E_s}$$

Where
$\Delta E_x$=voltage drop across resistor 128
$\Delta E_s$=voltage drop across resistor 129 and also across resistor 131
$\Delta E_w$=voltage drop across resistor 130

Also, Equation 20 may be related to Fig. 6 system as follows:

$$(20) \quad L_2 = L\, R_2/R_1 = k_2 \theta$$

Where
$R_1$=resistance of fixed resistor 132
$R_2$=resistance of variable resistor 133
($k_2$ and $\theta$ are the same as before.

While there have been disclosed certain embodiments of the invention in considerable detail in accordance with the applicable statutes, this is not to be taken as in any way limiting this invention but merely as being descriptive thereof.

It is claimed:

1. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, and means for measuring and comparing the changes in temperature of said circulating fluids in traversing said paths in order to determine the level of said liquid.

2. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, means for measuring and comparing the changes in temperature of said circulating fluids in traversing said paths, and means for indicating the level of said liquid as determined by said last-named measuring and comparing means.

3. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, electric circuit means including temperature-sensitive means connected therein for measuring and comparing the changes in temperature of said circulating fluids in traversing said paths, and means for indicating the level of said liquid as determined by said electric circuit means.

4. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, electric circuit means including thermocouple elements connected therein for measuring and comparing the changes in temperature of said circulating fluids in traversing said paths, and means for indicating the level of said liquid as determined by said electric circuit means.

5. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, EMF generating thermocouple elements located adjacent the extremities of said paths for measuring the temperature differences of the said fluids in traversing said paths, circuit means connecting the outputs of said thermocouple elements in series opposition for determining the difference between the temperature difference over said transverse path and that over said longitudinal path above the liquid in addition to the temperature difference between the temperature difference over said longitudinal path submerged in the liquid and that over the longitudinal path above the liquid, a ratiometer, and additional circuit means for connecting said ratiometer to the outputs of said series opposed thermocouples in order to compare the ratio of temperature differences for indicating the level of said liquid.

6. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, E.M.F. generating thermocouple elements located adjacent the extremities of said paths for measuring the temperature differences of the said fluids in traversing said paths, circuit means connecting the outputs of said thermocouple elements in series opposition for determining the difference between the temperature difference over said transverse path and that over said longitudinal path above the liquid in addition to the temperature difference between the temperature difference over said longitudinal path submerged in the liquid and that over the longitudinal path above the liquid, a balanceable network including said circuit means as elements on opposite sides thereof and having an output, a reversible motor connected to said output and controlled thereby, variable impedance means driven by said motor for balancing said network, and an indicator driven by said motor in conjunction with said variable impedance for indicating the level of said liquid.

7. A liquid level measuring system comprising means for circulating a fluid in heat exchanging relation with the surrounding medium over a path extending transversely to the surface of said liquid over the full range of liquid level variation, means for circulating a fluid in heat exchanging relation with the surrounding medium over a path extending longitudinally of the surface of the said liquid and above the highest measurable level of the liquid, means for circulating a fluid in heat exchanging relation with the surrounding medium over a path extending longitudinally of the surface of said liquid but submerged therein, means for changing the temperature of said circulating fluids to render them substantially different from the temperature of the said liquid, electric circuit means including temperature responsive resistance elements therein for measuring the temperatures of said circulating fluids at the extremities of said paths, a plurality of bridge networks including said temperature responsive resistance elements for measuring the difference in temperature of said circulating fluids at the extremities of said paths, a balanceable network including said bridge networks and having an output, a reversible motor connected to said output and controlled thereby, variable impedance means driven by said motor for balancing said network, and an indicator driven by said motor in conjunction with said variable impedance for indicating the level of said liquid.

8. Apparatus for measuring the level of a liquid in a closed container containing liquid which is substantially at a predetermined temperature, comprising means providing an orbital circulatory path for a temperature-sensitive fluid, a temperature changing means for said fluid interposed in a part of said path outside said closed container for bringing said fluid to a temperature substantially different from said predetermined temperature, means for causing said fluid to circulate in said orbital path, conduit means constituting a part of said orbital path and extending through said closed container between a lower portion and an upper portion thereof and constructed and arranged to be immersed in the liquid to be measured to an extent dependent upon the level of said liquid; temperature-sensitive electrical means arranged to be responsive to the temperature of said fluid as it enters and as it leaves the inside of said closed container in said conduit means, and electric circuit means including said temperature-sensitive means connected therein and constructed and arranged to be responsive to temperature differences in the fluid entering and leaving that portion of said orbital path passing through said closed container for indicating the levels of said liquid as functions of said temperature differences.

9. Apparatus for measuring the level of a liquid in a container, comprising a first elongate conductor extending through said container from top to bottom thereof and arranged to be immersed in the liquid in said container to an extent dependent upon the level of said liquid, a second elongate conductor disposed in said container adjacent to the bottom thereof so as always to be immersed in the liquid in said container, a third elongate conductor disposed in said container adjacent to the top thereof so as always to be above the level of the liquid in said container, means for maintaining said conductors at temperatures substantially different from the ambient temperature in said container and in the liquid therein, so that there will be a heat interchange between each of said conductors and their respective surroundings, separate means responsive to the temperatures attained by each of said conductors respectively as affected by said heat interchange for comparing said attained temperatures, and indicating means actuated in response to said comparing means for indicating the level of the liquid in said container.

10. Apparatus for measuring the level of a liquid in a container, comprising a first elongate conductor extending through said container from top to bottom thereof and arranged to be immersed in the liquid in said container to an extent dependent upon the level of said liquid, a second elongate conductor disposed in said container adjacent to the bottom thereof so as always to be immersed in the liquid in said container, a third elongate conductor disposed in said container adjacent to the top thereof so as always to be above the level of the liquid in said container, means for maintaining said conductors at temperatures substantially different from the ambient temperature in said container and in the liquid therein, so that there will be a heat interchange between each of said conductors and their respective surroundings, separate means responsive to the temperatures attained by each of said conductors respectively as affected by said heat interchange for comparing said attained temperatures, and indicating means actuated in response to said comparing means for indicating the level of the liquid in said container; and in which said means for comparing said attained temperatures comprise means for comparing the temperature attained by said first conductor with that attained by said third conductor to give a first comparison result, and means for comparing the temperature attained by said second conductor with that attained by said third conductor to give a second comparison result; and in which means are provided responsive to the ratio of said first and second comparison results for controlling said indicating means to indicate the level of the liquid in the container.

11. Apparatus in accordance with claim 10, in which said means responsive to the ratio of said first and second comparison results comprises a ratiometer.

12. Apparatus in accordance with claim 10, in which said means responsive to the ratio of said first and second comparison results comprises an electrical bridge network, in one arm of which there are electrical means responsive respectively to the temperatures attained by said first conductor and by said third conductor, and in a second arm of which there are electrical means responsive to the temperatures attained by said second conductor and by said third conductor, means connected to be responsive to the output of said bridge network for adjusting the value of a component of said network so as to reduce said output of said network substantially to zero and thereby to rebalance the bridge network and for operating said indicating means to indicate the liquid level as a function of the adjustment required to secure bridge rebalance.

13. Apparatus for measuring the level of a liquid in a container, comprising a first elongate conductor extending through said container from top to bottom thereof and arranged to be immersed in the liquid in said container to an extent dependent upon the level of said liquid, a second elongate conductor disposed in said container adjacent to the bottom thereof so as always to be immersed in the liquid in said container, a third elongate conductor disposed in said container adjacent to the top thereof so as always to be above the level of the liquid in said container, means for maintaining said conductors at temperatures substantially different from the ambient temperature in said container and in the liquid therein, so that there will be a heat interchange between each of said conductors and their respective surroundings, separate means responsive to the attained temperatures attained by each of said conductors respectively as affected by said heat interchange for comparing said attained temperatures, and indicating means actuated in response to the results of said comparing means for indicating the level of the liquid in said container; and in which each of said elongate conductors comprises a pipe having a portion thereof extending through said container for conducting a fluid medium therethrough.

14. Apparatus in accordance with claim 13, in which said means responsive to the temperatures attained by each of said conductors comprise electrical means responsive to the temperatures of said fluid medium as it enters and as it leaves each of the pipes comprising said conductors respectively.

15. Apparatus in accordance with claim 9, in which said means responsive to the temperatures attained by each of said conductors respectively comprise means positioned adjacent and substantially parallel to each of said conductors within said container, so as to be responsive to the temperatures along the lengths of each of said conductors within said container respectively.

16. Apparatus for measuring the level of a liquid in a container, comprising a first elongate conductor extending through said container from top to bottom thereof and arranged to be immersed in the liquid in said container to an extent dependent upon the level of said liquid, a second elongate conductor disposed in said container adjacent to the bottom thereof so as always to be immersed in the liquid in said container, a third elongate conductor disposed in said container adjacent to the top thereof so as always to be above the level of the liquid in said container, means for maintaining said conductors at temperatures substantially different from the ambient temperature in said container and in the liquid therein, so that there will be a heat interchange between each of said conductors and their respective surroundings, separate means responsive to the temperatures attained by each of said conductors respectively as affected by said heat interchange for comparing said attained temperatures, and indicating means actuated in response to the results of said comparing means for indicating the level of the liquid in said container; and in which each of said conductors comprises a conductor for electricity, so constructed and arranged that flow of electric current therethrough will heat those portions of each of said conductors within said container to a temperature higher than its respective surroundings, so as to establish a heat transfer from each of said conductors to its surroundings respectively.

17. Apparatus for measuring the level of a liquid in a container, comprising a first elongate conductor extending through said container from top to bottom thereof and arranged to be immersed in the liquid in said container to an extent dependent upon the level of said liquid, a second elongate conductor disposed in said container adjacent to the bottom thereof so as always to be immersed in the liquid in said container, a third elongate conductor disposed in said container adjacent to the top thereof so as always to be above the level of the liquid in said container, means for maintaining said conductors at temperatures substantially different from the ambient temperature in said container and in the liquid therein, so that there will be a heat interchange between each of said conductors and their respective surroundings, separate means responsive to the temperatures attained by each of said conductors respectively as affected by said heat interchange for comparing said attained temperatures, and indicating means actuated in response to the results of said comparing means for indicating the level of the liquid in said container; in which the portions of each of said conductors within said container are the same size; and in which said means for maintaining said conductors at temperatures substantially different from the ambient temperature in said container and in the liquid therein comprise means which would maintain each of said conductors at the same temperature if all said conductors were surrounded by the same medium.

18. Apparatus in accordance with claim 17, in which each of said conductors comprise a pipe through which a fluid medium flows; and further comprising a common means for simultaneously supplying the same fluid medium to all the pipes comprising said three conductors.

References Cited in the file of this patent
UNITED STATES PATENTS

| | | |
|---|---|---|
| 1,942,241 | Duhme | Jan. 2, 1934 |
| 2,015,249 | Benesh | Sept. 24, 1935 |
| 2,211,606 | Pratt | Aug. 13, 1940 |

FOREIGN PATENTS

| | | |
|---|---|---|
| 622,247 | France | Feb. 21, 1927 |
| 271,708 | Great Britain | June 2, 1927 |
| 130,943 | Sweden | Feb. 27, 1951 |